United States Patent [19]

Keys

[11] Patent Number: 5,092,078
[45] Date of Patent: Mar. 3, 1992

[54] INTEGRAL APPLIQUE AND GLASS RUN CHANNEL ASSEMBLY FOR STUB 'B' PILLAR APPLICATION

[75] Inventor: James F. Keys, West Bloomfield, Mich.

[73] Assignee: The Standard Products Company, Cleveland, Ohio

[21] Appl. No.: 573,847

[22] Filed: Aug. 28, 1990

[51] Int. Cl.⁵ .................. E06B 7/00; B60J 10/00
[52] U.S. Cl. .................................. 49/441; 296/201
[58] Field of Search ............ 296/201, 202; 49/440, 49/441

[56] References Cited

U.S. PATENT DOCUMENTS

| | | | |
|---|---|---|---|
| 3,198,572 | 8/1965 | Stolarczyk | 296/201 |
| 4,229,036 | 10/1980 | Toda | 296/202 |
| 4,348,046 | 9/1982 | Ohya | 296/201 |
| 4,591,204 | 5/1986 | Gallitzendoerfer et al. | 296/202 |
| 4,688,847 | 8/1987 | Freudenberg | 49/440 X |
| 4,932,712 | 6/1990 | Tomforde | 296/201 X |

Primary Examiner—Margaret A. Focarino
Assistant Examiner—Andrew C. Pike
Attorney, Agent, or Firm—Harness, Dickey & Pierce

[57] ABSTRACT

An appliqué and glass run channel assembly includes an appliqué portion which has a portion thereof which extends over the glass run channel portion of a stub 'B' pillar. A glass run attachment is attached to the back of the appliqué and only a small lip portion extends outward from the edge of the appliqué. The lip portion is substantially within the plane of the appliqué. This configuration provides an improved transitional appearance and better tolerances for such an appliqué. An improved attachment of a stub 'B' pillar appliqué is also provided which includes a novel stud and locking depression combination.

7 Claims, 3 Drawing Sheets

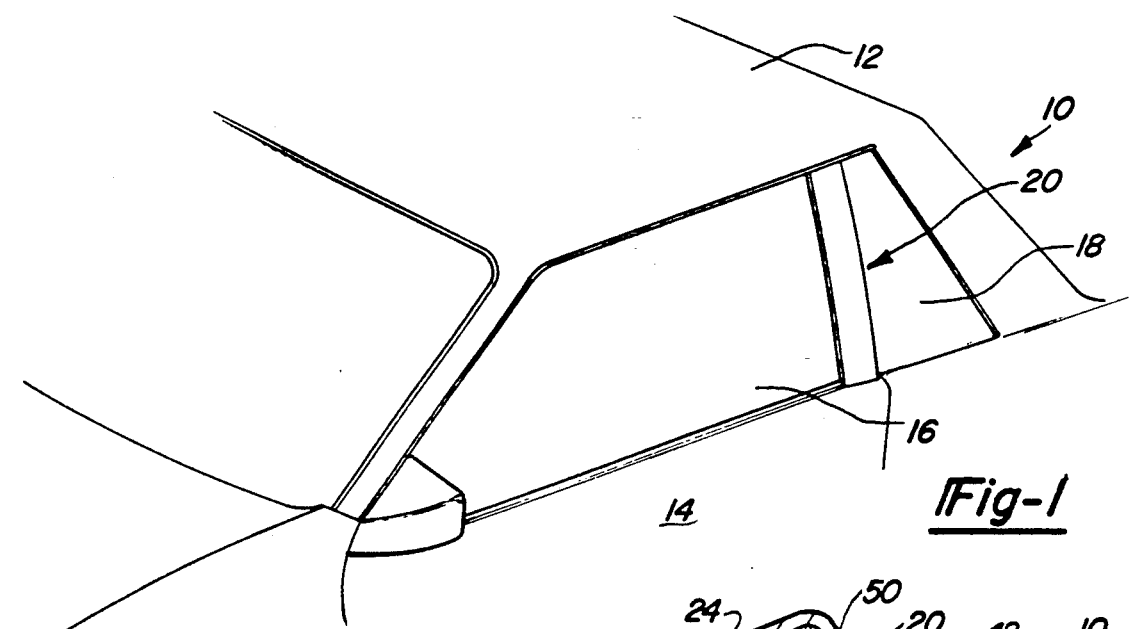
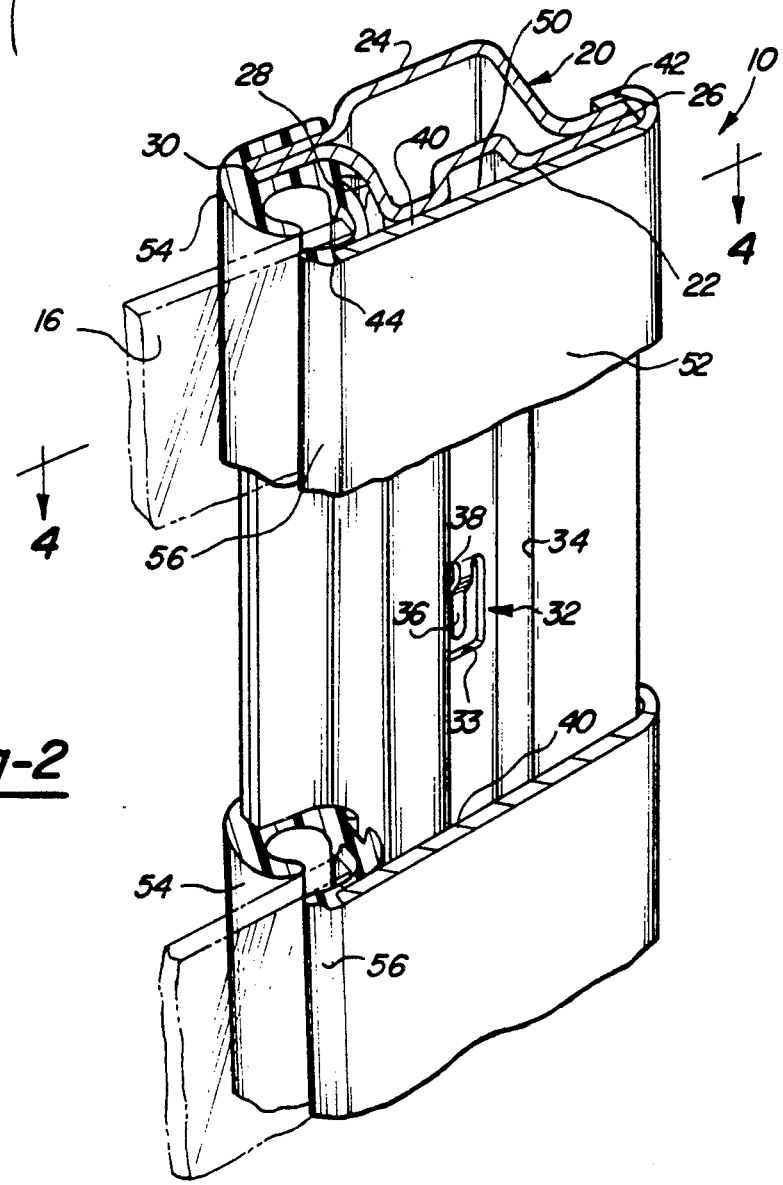

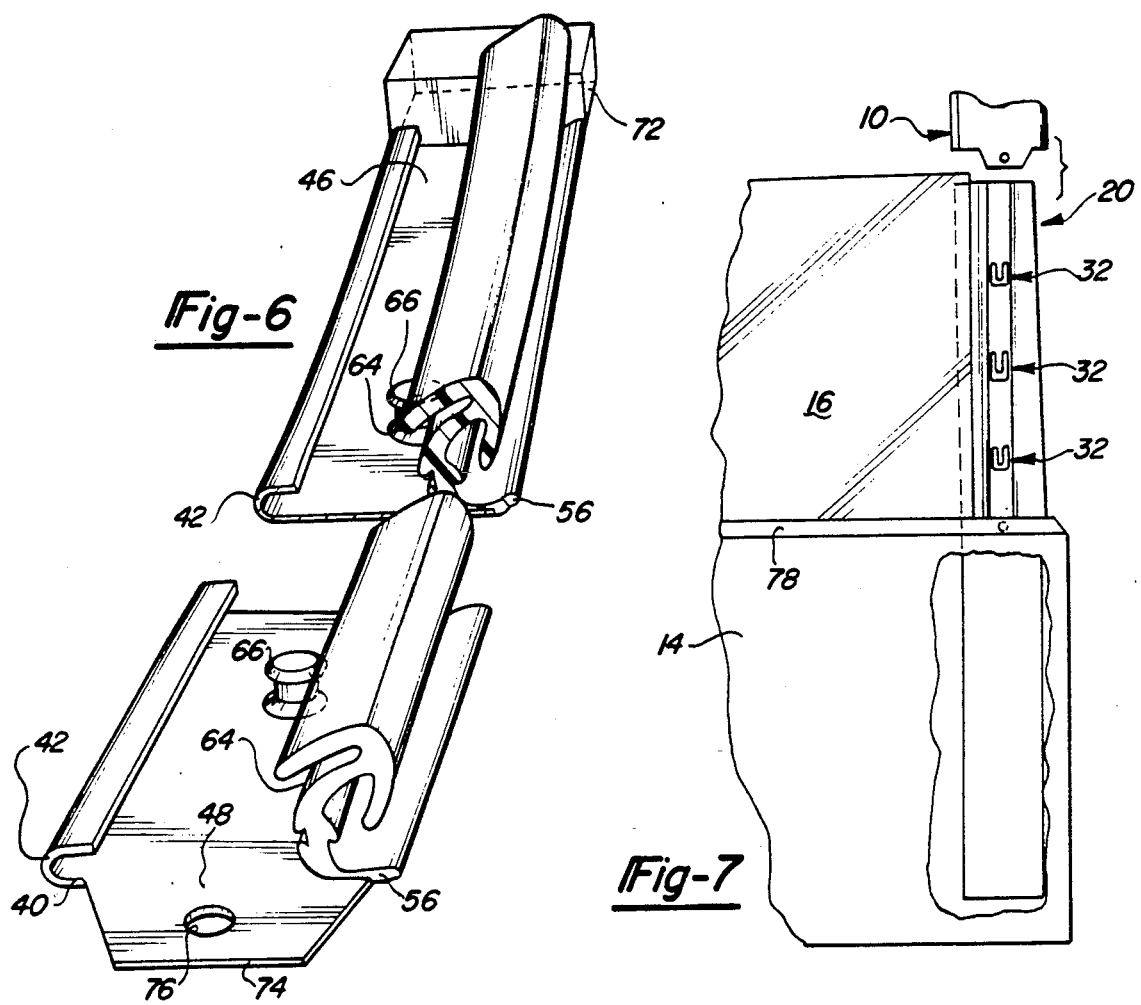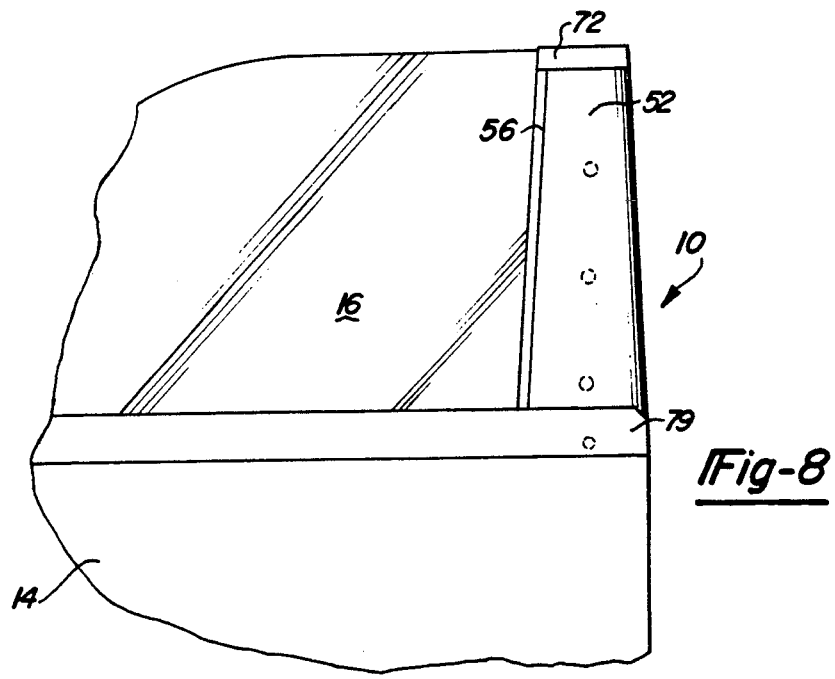

INTEGRAL APPLIQUE AND GLASS RUN CHANNEL ASSEMBLY FOR STUB 'B' PILLAR APPLICATION

BACKGROUND OF THE INVENTION

The present invention relates to an integral appliqué and glass run channel assembly for a 'B' pillar of a vehicle.

In recent years it has been desirable to provide various trim strips to add styling and also to functionally cover unsightly portions of a vehicle. A particularly troublesome area on a vehicle to accommodate in such a manner has been the 'B' pillar of a vehicle.

Because of the high visibility of the 'B' pillar area, appliqués are in common use today to provide an aesthetically pleasing surface on the manufactured 'B' pillar. Such an appliqué is used to cover manufacturing imperfections and the like on the structural portion of the 'B' pillar. Commonly, the appliqué is finished in cooperating or matching vehicle colors to provide a desired aesthetic appearance.

In the past, it has been typical to provide an appliqué which covers the external surfaces of the 'B' pillar and which has attached adjacent thereto a glass run channel weatherstrip or the like which is visible from the exterior of the vehicle. In the past such structures have been a relatively suitable solution. However, in recent years there have been pressures in automotive design for producing less wind resistant and smoother transition surfaces at such areas. Therefore, it has been desirable to provide an improved appliqué wherein the visible transition from the appliqué portion to the glass run channel is greatly decreased such that it appears that there is a transition from the appliqué directly to the drop glass window. Such a structure would advantageously provide an improved aesthetic appearance and would also operate to reduce wind resistance and wind noise associated with such external appliqués. In addition, such a structure would produce a smoother overall contour which is desirable in automotive designs of today.

SUMMARY OF THE INVENTION

Therefore, it is an object of the present invention to provide an improved 'B' pillar appliqué assembly which provides a smooth transitional surface between the drop window of the glass run and the 'B' pillar appliqué.

In accordance with the present invention there is provided an appliqué and glass run channel assembly for a 'B' pillar. The 'B' pillar includes an outboard surface and a side portion for allowing clearance for a drop glass window and glass run channel on a first side and a cut edge on the other side. The assembly of the present invention includes an appliqué portion which has an outboard show surface and an inboard surface. The appliqué portion includes a first side and a second side on either side of its width. The first end has a portion which extends beyond the outboard surface for overlying the side portion of the 'B' pillar when installed thereon. The first end includes a terminal cut surface.

A glass run channel attachment is co-extruded onto the rear surface at the first end. The glass run channel includes a lip sealing portion which extends from the terminal cut surface of the first end. The lip sealing portion is attached to the terminal side edge and provides for a transitional surface which will substantially not extend outward from the front show surface. The lip slidably engages the glass window. The glass run attachment includes a body portion for fitting into the side portion of the 'B' pillar for forming a glass run channel. An overturned lip portion is provided at the second end of the appliqué portion for overlying the cut edge of the 'B' pillar for securing of the second end to the 'B' pillar. A locking assembly is provided for securing the appliqué to the 'B' pillar.

Additional benefits and advantages of the present invention will become apparent from the subsequent description of the preferred embodiment taken in conjunction with the accompanying drawings.

BRIEF DESCRIPTION OF THE DRAWINGS

FIG. 1 is a perspective view of a typical vehicle having a stub 'B' pillar configuration;

FIG. 2 is a detailed perspective view partially broken away and partially in section showing an appliqué assembly made in accordance with the teachings of the present invention in its 'B' pillar operational environment;

FIG. 6 is a detailed rear perspective view, partially broken away, of the appliqué assembly of the present invention;

FIG. 7 is a view of a stub 'B' pillar configuration utilized in the present invention;

FIG. 8 is a view of a finished door having an appliqué assembly made in accordance with the teachings of the present invention installed thereon.

DETAILED DESCRIPTION OF THE PREFERRED EMBODIMENTS

Figure 3:
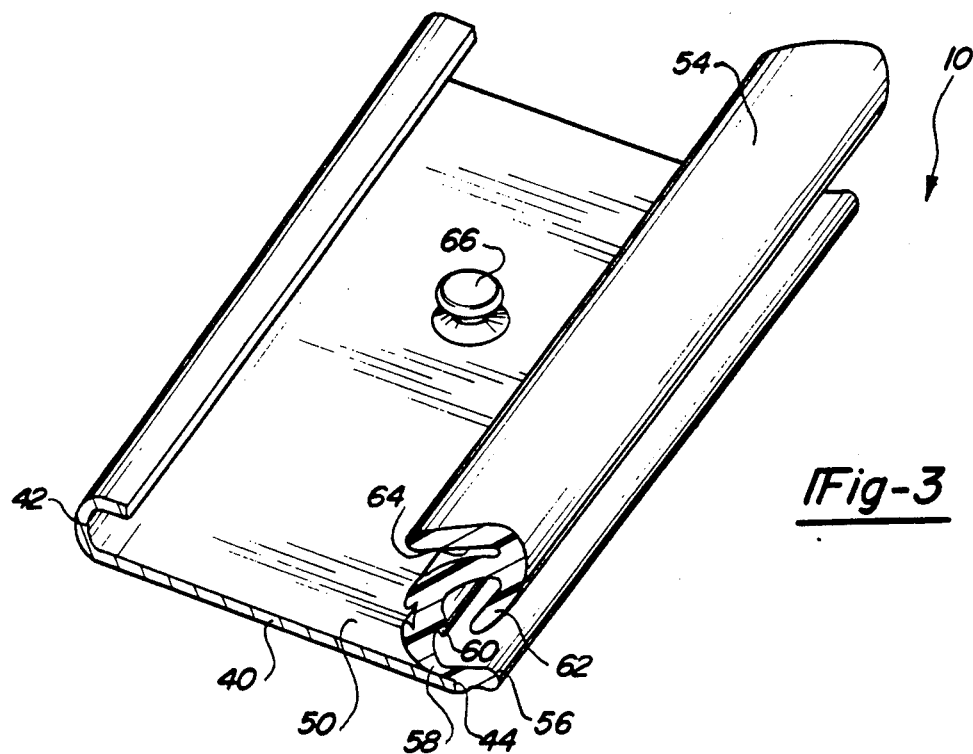
FIG. 3 is a perspective rear view showing an appliqué assembly made in accordance with the teachings of the present invention.

In accordance with the present invention there is provided an appliqué and glass run channel assembly generally shown at 10.

Referring now to FIG. 1 there is shown a vehicle 12 which includes a door assembly 14. The door assembly 14 includes a drop window glass 16. The 'B' pillar of vehicle 12 is generally indicated at 20 in FIG. 1. The 'B' pillar 20 separates the front door from the rear window 18. In four-door vehicles the 'B' pillar would separate the front window 16 from rear doors of the vehicle. In typical applications, the 'B' pillar must include a space for a glass run channel for the drop window glass 16. The present invention may be utilized on a normal 'B' pillar wherein there is a header strip or on a stub 'B' pillar such as shown in the drawings. Stub 'B' pillars are common on hard top ceiling designs. Such hard top designs lack the normal header portion but, rely on the existence of the ceiling using the primary door aperture in the roof seal as a surrogate door header seal.

Figure 4:
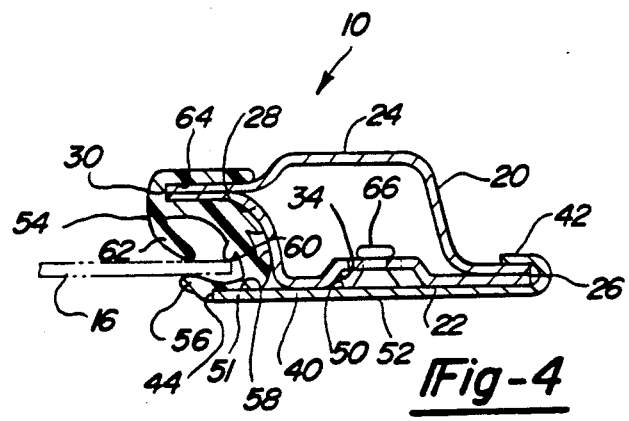
FIG. 4 is a cross-sectional view of the appliqué assembly taken along line 4—4 of FIG. 2.

Referring to FIGS. 2 and 4 there is shown a more detailed sectional view of the stub 'B' pillar 20. The stub 'B' pillar 20 utilized in accordance with the teachings of the present invention includes an outboard side 22 and an inboard side 24. The 'B' pillar 20 also includes a top cut edge 26. A glass run channel receiving area 28 is provided on the other side of the width of the 'B' pillar 20. As can be seen in the drawings, the 'B' pillar assembly is made out of two (2) formed metal flanges which are welded first along the cut edge 26 and second at the other side along the width for forming flange portion 30.

The outboard side 22 of the 'B' pillar 20 includes at least one stud locking depression 32 which is provided in the longitudinally extending central channel portion 34. The stud locking depression formed therein includes an aperture 33 which has a tongue portion 36 extending therein. The tongue portion 36 is formed from the metal which forms the front outboard side of the 'B' pillar 20 and includes a bent leg 38 for recessing the tongue portion 36 in the aperture 33.

Referring now to FIGS. 2 through 6 the appliqué article 10 of the present invention is shown in more detail as will be seen below. The appliqué article 10 of the present invention includes a flat sheet strip portion 40 which has a predetermined length and width for fitting on the 'B' pillar 20. The strip 40 includes a first overturned end portion 42 and a second cut edge 44 on either side of its width. The appliqué 10 includes an upper end 46 and a lower end 48 which are best shown in FIG. 6. The strip includes an inboard surface 50 and an outboard surface 52. The outboard surface 52 is treated with a finish coating such as a DURANAR ® or FLUOREX ® coating to color match the vehicle styling or may be coated in a contrasting yet cooperating color as would be aesthetically pleasing. The inner surface 50 is coated with a CHEMLOK (a registered trademark of Hughson Chemical Company) bonding enhancer for promoting rubber/metal bonding during extrusion. The use of such a composition provides advantageous secure bonding of the glass run channel when extruded onto the inboard side 50 of the strip 40.

The width of the strip 40 is wide enough such that a portion 51 of the strip 40 adjacent the cut edge 44 extends over the surfaces 28 forming the glass run channel receiving portion of the 'B' pillar. Referring now to FIGS. 2, 3, and 4, a glass run channel 54 is extruded onto the inboard side of the strip at the cut edge portion 44. The glass run channel 54 is extruded on the inboard side 50 of strip 40 such that an outside sealing lip portion 56 extends from the cut edge 44 in substantially the same plane as the strip 40. The glass run channel 54 includes an attachment portion 58 which attaches directly to the CHEMLOK ® treated inboard surface 50 at the overhanging edge 44. The remaining portion of the glass run channel 54 includes a pair of inward sealing lips 60 and 62 which seal against the inside of the drop glass window 16. A flange engaging channel 64 is formed at the other edge of the glass run channel assembly for engaging the flange portion 30 of the 'B' pillar 20. As will be readily appreciated by those skilled in the art, the extruded channel could include a strengthening core if a particular 'B' pillar application did not include the structural flange 30.

Figure 5:
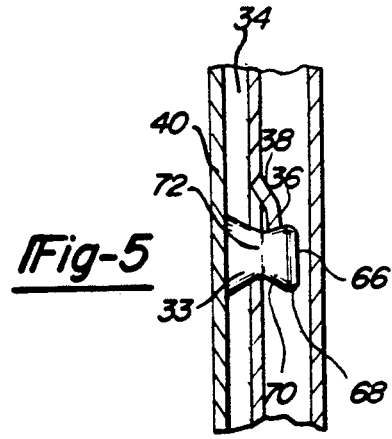
FIG. 5 is a detailed sectional view of the locking stud configuration of an appliqué and 'B' pillar assembly made in accordance with the teachings of the present invention, taken along line 5—5 of FIG. 4.

The appliqué assembly of the present invention also includes at least one locking stud protrusion 66 which is attached to the inboard side 50 of the strip portion 40. The number of locking stud protrusions corresponds to the number of locking stud apertures in the 'B' pillar 20. The locking stud protrusion 66 includes an enlarged head portion 68 and sloping sides 70 which lead to a base portion 72. The locking studs 66 may be attached to the strip portion 40 by way of spin welding or the like or may be glued or otherwise attached to the portion 40. Referring specifically to FIGS. 5 and 7, appliqué 10 is slid into position by a downward movement along 'B' pillar 20 whereby the locking studs 66 are moved into position. The locking studs 66 snap into the locking depression 32 and tongue 36 engages the sloping side portion 70 underneath the enlarged head portion 68 to secure the appliqué in place on the 'B' pillar.

Referring now to FIGS. 6 through 8 the appliqué assembly is shown in its working environment. In its final manufacturing form the appliqué may include an end cap 73 at the upper end 46 to provide the proper fit and finish at the top of the stub 'B' pillar 20. A flange portion 74 may be provided at the lower portion which includes a screw aperture 76 and attaches even with the belt shelf 78 of a typical vehicle door 14.

In operation, the stub 'B' pillar 20 preferably includes three (3) locking depressions 32. Thereafter the appliqué assembly as shown in FIGS. 5, 6, and 7 is moved in a downward direction along the stub 'B' pillar somewhat deflecting the strip portion 40 outward in order to provide clearance for the locking protrusions 66. Upon reaching the alignment of the locking protrusions 66 with the stud locking depressions 32, the installer provides inward pressure and downward pressure in order to lock the protrusion 66 into the depressions 32 for securing the appliqué onto the 'B' pillar as shown best in FIG. 4. After this is accomplished, a fastener may be fastened through the aperture 76 onto the belt shelf 78 and a belt weather strip 79 is placed along the belt shelf 78 thereby covering the flange portion 74.

Thus in the finished assembly, the outside appearance is a single color fastener-free appearance all along the width of the appliqué and substantially covering the glass run, wherein only a small width lip portion 56 is provided to give the transition from the appliqué to the glass 16. This is a substantial improvement in both finish and function over the prior art which is shown in FIG. 9.

Figure 9:
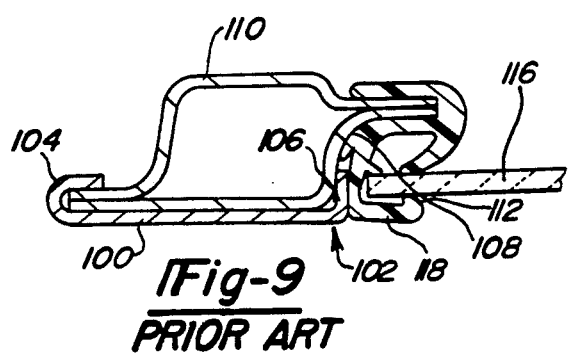
FIG. 9 is a cross-sectional view of a typical prior art 'B' pillar appliqué assembly.

Referring to FIG. 9 in the prior art assembly, the prior art appliqué includes a first appliqué portion 100 and a second glass run channel portion 102. As can be seen in FIG. 9, the appliqué portion 100 includes an overturned flange 104 on a first end and an angled flange 106 on a second end which fits into the glass run space 108 on the 'B' pillar 110.

In the prior art the glass run assembly extended outward from the glass run in order to provide clearance for the lip 112 which engages the glass 116. The glass run of the prior art included a rather wide leg portion 118 which detracted from the appearance and made a noticeable transition from the surface of the appliqué 100 to the glass panel 116.

Thus, in the present invention this problem has been solved in that the transition between the appliqué and the glass 16 is just slightly more than the thickness of the appliqué itself. And also the lip portion 56 which is the only visible portion of the glass run channel weather strip assembly is relatively minor thus giving a more pleasing appearance and also improving the functionality of the sealing lip 56.

The present invention has been described in an illustrative manner. It is to be understood that the terminology which has been used is intended to be in the nature of words of description rather than of limitation. Obviously, many modifications and variations of the present invention are possible in light of the above teachings. Therefore, within the scope of the appended claims, the present invention may be practiced otherwise than as specifically described.

What is claimed is:

1. An appliqué and glass run channel assembly for a stub 'B' pillar having an outboard surface and a side portion for allowing clearance for a drop glass window on one side and a cut edge on another side, said assembly comprising:
    an appliqué portion having a front show surface and a rear surface, said appliqué portion having a first end and a second end on either side of a width thereof, said first end of said appliqué portion extending beyond said outboard surface for overlying said side portion of said stub 'B' pillar when installed thereon, said first end including a terminal cut surface;
    a glass run attachment extruded onto the rear surface at said first end, said glass run attachment including a lip sealing portion extending from the terminal cut surface of said first end, said sealing lip portion attached to said terminal cut surface for providing a transitional surface which will substantially not extend outward from said front show surface, said sealing lip being adapted for slideable engagement with a glass window panel of a vehicle, said glass run attachment having a body portion for fitting into said side portion;
    an overturned lip portion at said second end of said appliqué portion for overlying said cut edge of said stub 'B' pillar for securing of said second end to said stub 'B' pillar; and
    a means for securing said appliqué to said stub 'B' pillar.

2. The appliqué assembly of claim 1 wherein said appliqué portion further includes an upper and a lower end; said assembly further comprising a securement flange extended from said lower end for securement to a belt shelf of the vehicle.

3. The appliqué assembly of claim 2 further comprising an end cap molded onto the upper end of the appliqué portion.

4. A stub 'B' pillar and appliqué assembly comprising:
    a stub 'B' pillar for a vehicle door having a length and a width, said stub 'B' pillar including an outboard side and a first cut edge along a first side of the width and a second side forming a glass run receiving area, said outboard side including at least one stud locking depression formed therein comprising an aperture and a tongue portion extending into said aperture; and
    an appliqué article comprising: a flat sheet strip having a length and a width, said strip including an upper end and a lower end along the length thereof and a first cut end and a second overturned end along the width thereof, said strip having an inboard side and an outboard side, said first cut end extending substantially over said glass run receiving area of said stub 'B' pillar when attached to said stub 'B' pillar, a glass run member attached to the inboard side of said strip at said first cut end such that said glass run member is substantially shielded from view from said outboard side of said strip, said glass run member including an outer lip portion extending from and attached to said first cut end for providing an outer sealing lip, and at least one locking stud protrusion extending from the inboard side of said strip for cooperating with said stud locking depression for securing said appliqué to said stub 'B' pillar, in cooperation with said overturned edge engaging the cut edge of said stub 'B' pillar.

5. The stub 'B' pillar and appliqué assembly of claim 4 wherein said stub 'B' pillar further comprises a longitudinally extending central channel extending in an inboard direction into said stub 'B' pillar and said at least one stud locking depression is formed in said central channel.

6. The stub 'B' pillar and appliqué assembly of claim 4 further comprising a securement flange extending from said lower end for fastening to a belt shelf of a door.

7. The stub 'B' pillar and appliqué assembly of claim 4 further comprising an end cap attached at said upper end of said strip.

* * * * *